July 23, 1940.  B. M. HYMAN  2,209,056
CORN PICKER
Filed Aug. 12, 1938  3 Sheets-Sheet 1
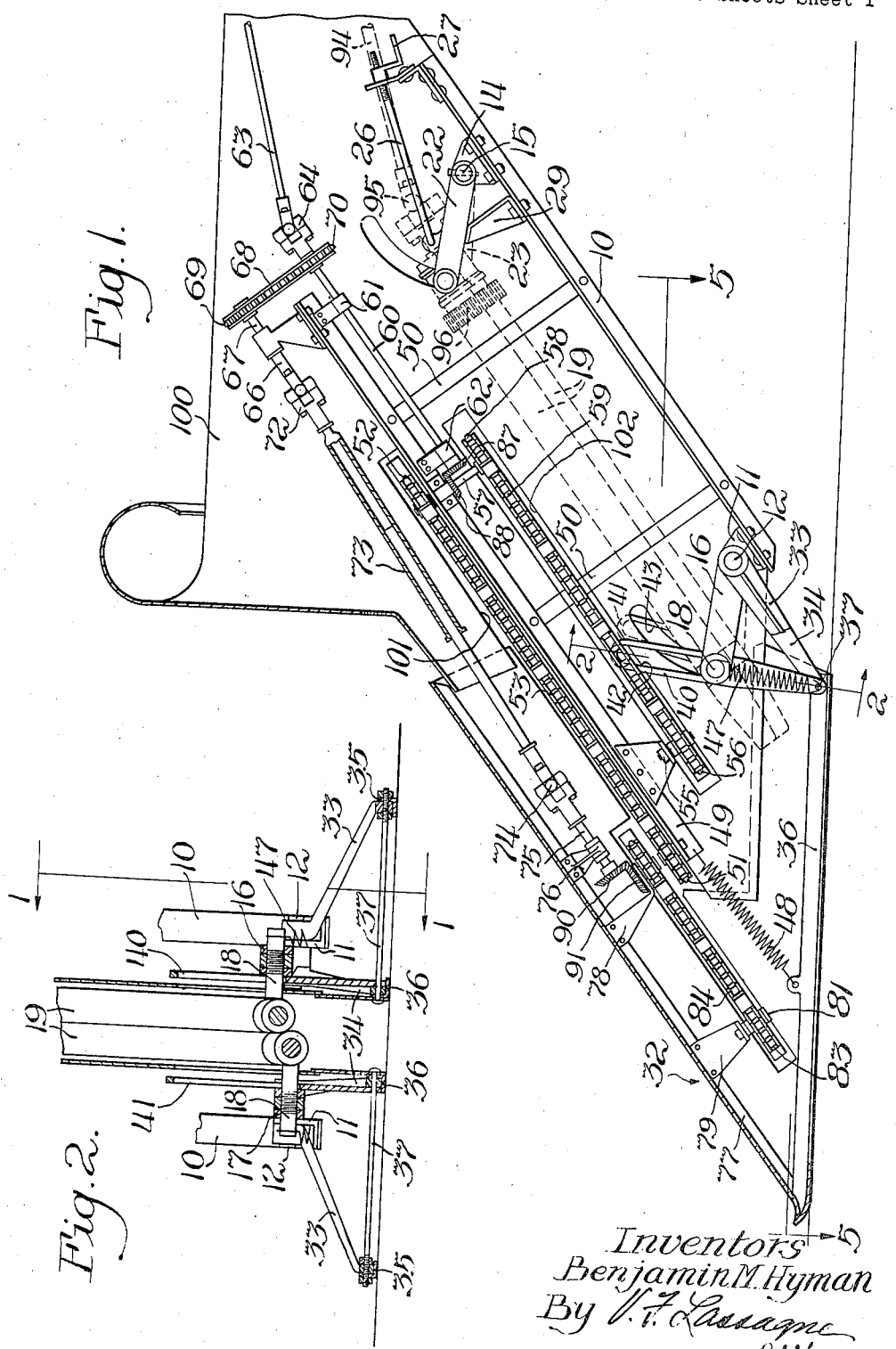

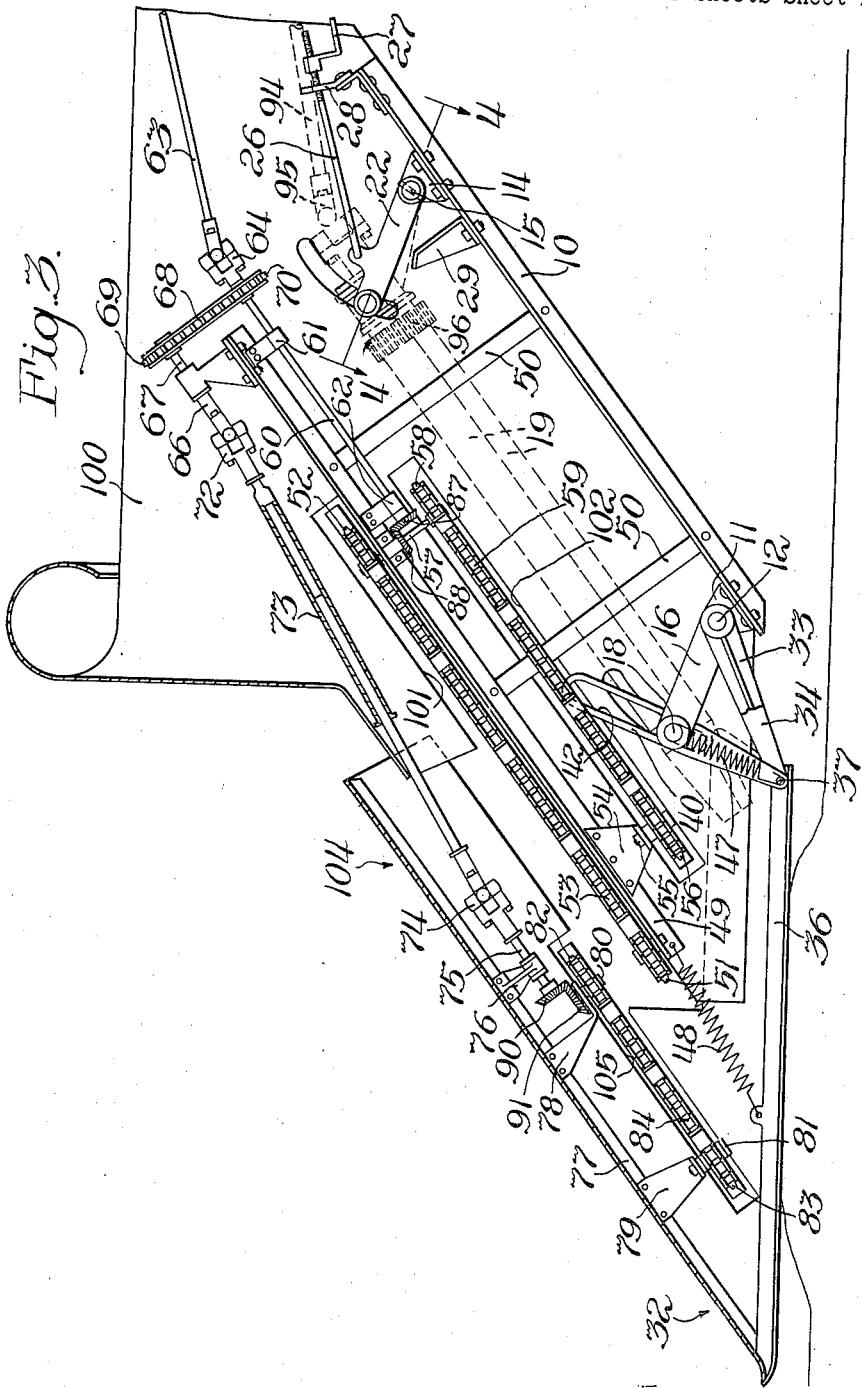

July 23, 1940.　　　　B. M. HYMAN　　　　2,209,056
CORN PICKER
Filed Aug. 12, 1938　　　3 Sheets-Sheet 3

Inventor
Benjamin M. Hyman
By V. T. Lauagne
Att'y.

Patented July 23, 1940

2,209,056

UNITED STATES PATENT OFFICE 2,209,056

CORN PICKER

Benjamin M. Hyman, Moline, Ill., assignor to International Harvester Company, a corporation of New Jersey Application August 12, 1938, Serial No. 224,432

20 Claims. (Cl. 56—112)

This invention relates to a corn picker, and more specifically it relates to a corn picker having floating gather points and floating snapping rolls.

It is desirable in corn picker construction to make the gather points and snapping rolls adjustable, so that they may follow the uneven contour of the ground. Normally, this is done by having an entire picker unit pivotally mounted whether on a tractor or on a separate vehicle pulled behind a tractor, so that the entire unit may move toward and away from the ground. Such an arrangement requires a rather complicated construction, and it is thought that this difficulty may be overcome by the provision of a rigidly mounted corn picker with adjustable or floating gather points and snapping rolls.

An object of this invention is to provide an improved corn picker.

A further object of the invention is to provide a corn picker in which the snapping rolls and gather points may float.

Another object of the invention is to provide a corn picker with floating snapping rolls and gather points so connected that movement of the snapping rolls will produce movement of the gather points, and vice versa.

Still another object of the invention is a construction with floating snapping rolls and gather points wherein the gather points and the snapping rolls are interconnected but yet there is a certain independence of movement.

According to the present invention, a corn picker frame is rigidly mounted either upon a tractor or upon a separate vehicle adapted to be pulled by a tractor. Snapping rolls are floatingly and adjustably mounted on the frame by means of parallel links. Gather points are floatingly mounted upon the frame through links which pivot about the same axis as certain of the parallel links carrying the snapping rolls. There are also slotted links connecting the gather points and snapping rolls. The entire arrangement is such that the snapping rolls may be adjusted out of a fixed, lowermost position with respect to the ground and yet are free to move above that position, and the gather points are free to move up and down with respect to the frame, and will cause the snapping rolls to move up when the gather points themselves have moved up to a certain point.

In the drawings—

Figure 1 is a section through a gather point and adjacent portions of a corn picker taken along the line 1—1 of Figure 2, and showing the gather point passing over level ground;

Figure 2 is a section taken along the line 2—2 of Figure 1, showing the interconnection of frame, snapping rolls, and gather points;

Figure 3 is a section similar to that of Figure 1, showing the gather point passing over a rise in the ground;

Figure 5:
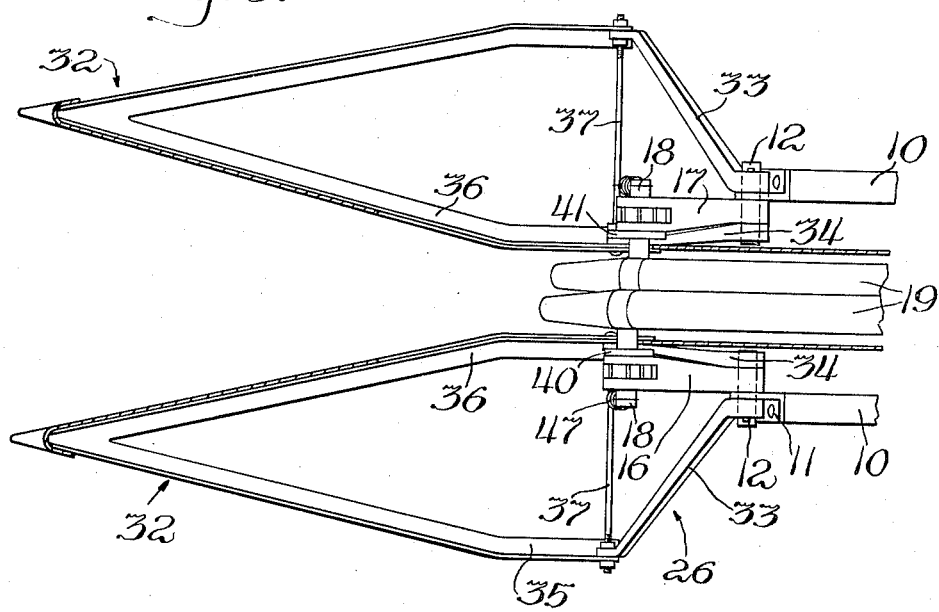
Figure 4:
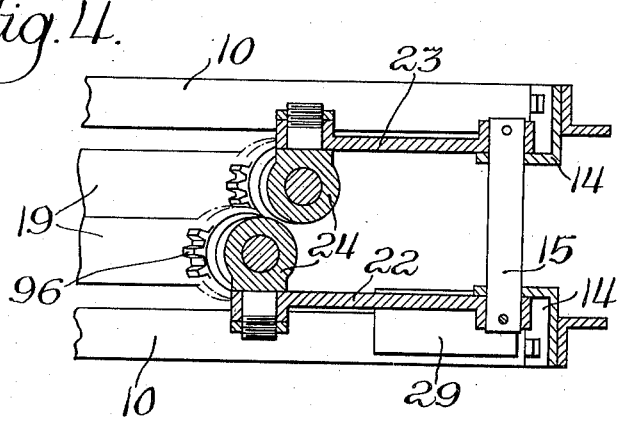
Figure 4 is a section taken along the line 4—4 of Figure 3, showing the links by which the snapping rolls are supported on the frame; and, Figure 5 is a section taken along the line 5—5 of Figure 1.

The structure embodies a pair of angle members 10, which may be considered as part of a frame fixed to a tractor, not shown, or to a vehicle adapted to be drawn behind a tractor, also not shown. Fixed to the angle members 10 are brackets 11 journaling stub shafts 12, and brackets 14 journaling stub shaft 15. Fixed to the ends of the stub shafts 12 are links 16 and 17, link 16 being longer, to which are bolted bearing members 18 carrying the lower ends of snapping rolls 19. Links 22 and 23, corresponding respectively to links 16 and 17, are fixed to the ends of the stub shaft 15, to which are bolted bearing members 24 carrying the upper ends of the snapping rolls 19. Because links 16 and 22 are longer than links 17 and 23, the one snapping roll is higher than the other. Pivotally attached to the link 22 of the rear pair, a rod 26 is threaded at one end and carries thereon an adjustably positioned crank 27. The threaded end of the rod 26 passes through a bracket member 28 fixed to one of the angle members 10. Immediately below the bracket member 14, there is an upstanding member 29. With the arrangement of parts just described, the snapping rolls are held against movement relative to one another, but are capable of movement relative to the angle members 10 by virtue of their connection thereto through the parallel links 16, 17, 22 and 23. The upstanding member 29 serves as a stop, which limits the lowermost position of the snapping rolls, the one link 22 of the upper pair striking the member 29. The crank 27 and bracket member 28 also serve as a stop. The crank is adjustable along the rod 26, so that the downward movement of the snapping rolls may be limited to any point above the stop 23.

Gather points 32 are attached to the angle members 10 at the brackets 11 through pairs of links 33 and 34 pivoted on the stub shaft 12 journaled in the brackets 11. Connection of the links 33 and 34 with the gather points is through the angle members 35 and 36, forming the ground contacting part of the gather points. These angle members 35 and 36 are held apart at their rear ends where they are connected to the links 33 and 34 by means of bolts 37, and are joined at their forward ends for forming the gather points proper. Links 40 and 41 are pivoted on the bolts 37 and receive in slots 42 and 43 bearing members 15, which support the lower end of the snapping rolls 19.

With the above described arrangement, the snapping rolls are floatingly mounted on the frame of the corn picker, and the gather points are also floatingly mounted on the frame independently of the snapping rolls. Because of the slotted links 40 and 41, however, the movement of the snapping rolls and the gather point is not completely independent. Figure 1 shows the snapping rolls in their lowermost position with the link 22 at the upper end of the rolls against the upstanding member 29. The picker is moving over level ground. Figure 3 shows the divider points passing over a rise in the ground or an obstruction. Their upward movement has caused a corresponding upward movement of the snapping rolls through the medium of the links 40 and 41.

In some instances the corn picker will be operated with the snapping rolls somewhat above the position of Figure 1. The necessary adjustment will be made by means of the crank 27. The bearing members 15 supporting the lower ends of the snapping rolls will be somewhat above the lower ends of the slots 42 and 43 of the links 40 and 41. Consequently, when the divider points pass over an obstruction, they may move up a certain amount before the ends of the slots 42 and 43 contact the bearing members 15 at the lower ends of the snapping rolls, causing the snapping rolls to move. By the above arrangement, the snapping rolls may have a certain independent movement, and the divider points, a certain independent movement, but upward movement of the divider points beyond a certain point will cause an upward movement of the snapping rolls.

A spring 47 extends between each bearing member 15 and the corresponding bolt 37 at the base of the gather point. There is also spring 48 connecting each angle member 36 and an angle member 49 rigidly fixed to the angle member 10. The springs serve to balance the gather points properly.

Extending from each angle member 10 are members 50 attached to the angle member 49, upon which are journaled gears 51 and 52 for a gathering chain 53. A bracket 54 is fixed to the lower end of the angle member 49 and supports a stub shaft 55 carrying a gear 56. From near the other end of the angle member 49 a shaft 57 extends, supporting the gear 52. This shaft also carries a gear 58 for a gathering chain 59. A shaft 60 is supported from the rear of the angle member 49 by means of brackets 61 and 62. The shaft 60 is connected with a shaft 63 through a universal joint 64. Extending upwardly from the rear end of the angle member 49 is a bracket member 66 supporting a shaft 67. The shaft 67 is connected to shaft 60 by means of sprocket chain 68 and gear 69 on shaft 67 and gear 70 on shaft 60. A universal joint 72 connects the shaft 67 and a telescoping shaft 73. A universal joint 74 connects the shaft 73 and a shaft 75 supported in a bracket 76 carried by a member 77 extending upwardly from the front ends of angle members 35 and 36. The member 77 also carries brackets 78 and 79 supporting stub shafts 80 and 81 and gears 82 and 83 thereon for gathering chain 84.

Drive of all the gathering chains is effected by means of the shaft 63. Drive to gathering chains 53 and 59 is transmitted from shaft 63 through universal joint 64, shaft 60, bevel gears 87 and 88, shaft 57, and gear 52 for chain 53, and gear 58 for chain 59. Drive of the gathering chain 84 mounted in the gathering point is transmitted from the shaft 63 through universal joint 64, shaft 60, gears 69 and 70, sprocket chain 68, shaft 67, universal joint 72, telescoping shaft 73, universal joint 74, shaft 75, bevel gears 90 and 91, stub shaft 80, and gear 82.

Drive of the snapping rolls 19 is effected by a shaft 94 connected to the lower snapping roll 19 by universal joint 95. There are spur gear sections 96 on the snapping rolls, which transmit drive from one roll to the other.

A shield 100 extends over the mechanism carried by the frame members 10, which shield is slotted at 101 for gathering chain 53, and slotted at 102 for gathering chain 59. There is a shield 104 extending over each gather point from the angle member 35 around the member 77 to the angle member 36. This shield is slotted at 105 for the gathering chain 84.

From the foregoing description it is apparent that a new and novel picker has been provided, which has floating snapping rolls and floating gather points. With this arrangement it is not necessary that the entire picker unit be pivotally mounted, and yet the gather points and snapping rolls can rise and fall with a varying contour of ground.

The intention is to limit the invention only by the terms of the appended claims.

What is claimed is:

1. A picker construction comprising a frame, a gather point pivotally mounted thereon, a pair of snapping rolls pivotally mounted on the frame, and means connecting the gather point and the snapping roll pair for causing one to pivot in response to pivoting of the other.

2. A picker construction comprising a frame, a gather point pivotally mounted on the frame and carrying a gathering chain, a pair of snapping rolls pivotally mounted on the frame by means of parallel links, means connecting the gather point and the snapping roll pair for causing one to pivot in response to pivoting of the other, and means connected to the snapping rolls and to the gather point for providing pivoting of the snapping roll pair independently of the gather point.

3. A picker construction comprising a frame, a gather point pivotally mounted on the frame, a pair of snapping rolls pivotally mounted on the frame, means connecting the gather point and snapping roll pair for causing each to pivot in response to pivoting of the other, and means connected to the snapping rolls and to the gather point for providing an independent pivoting of the snapping roll pair in one direction and an independent pivoting of the gather point in the opposite direction.

4. A picker construction comprising a frame, a gather point pivotally mounted on the frame and carrying a gathering chain, a pair of snapping rolls pivotally mounted on the frame by means of parallel links, means connecting the gather point and the snapping rolls for causing the snapping rolls to pivot in response to pivoting of the gather point, and means associated with the snapping rolls and the gather points for providing an independent pivoting of the snapping rolls.

5. A picker construction comprising a frame, a gather point pivotally mounted thereon, a pair of snapping rolls pivotally mounted on the frame by means of parallel links, means connecting the gather point and the snapping rolls for causing the snapping rolls to pivot in response to pivoting of the gather point, and means associated with the snapping rolls and the gather points for providing an independent pivoting of the snapping rolls.

6. A picker construction comprising a frame, a gather point pivotally mounted on the frame, and a pair of snapping rolls mounted on the frame through parallel links one of which is pivoted to the frame at the same point as the gather point.

7. A picker construction comprising a frame, a gather point pivotally mounted on the frame, a pair of snapping rolls mounted on the frame through parallel links one of which is pivoted on the frame at the same point as the gather point, and means connecting the snapping roll pair and the gather point for causing movement of one to effect movement of the other.

8. A picker construction comprising a frame, a gather member pivotally mounted on the frame, a snapping roll attached to the frame through parallel links, one of which is pivoted on the frame at the same point as the gather member, and a link attached to the gather member and receiving a portion of the snapping roll in an elongated slot formed in the link.

9. A picker construction comprising a frame, a pair of gather members pivotally mounted thereon, a pair of snapping rolls attached to the frame through parallel links and connected to one another so as to prevent relative movement, means connecting one gather member and one snapping roll and the other gather member and the other snapping roll for causing movement of the snapping rolls in response to movement of the gather members, and means disposed between the snapping rolls and the gather points for providing an independent movement of the snapping rolls.

10. A picker construction comprising a frame, a pair of gather members pivotally mounted on the frame on the same axis, a pair of snapping rolls connected to one another against relative movement and each attached to the frame by means of parallel links, one link for each snapping roll being pivoted on the same axis as the gather members, a first connecting member attached to one gather member and receiving a portion of one snapping roll in an elongated slot formed in said first connecting member, and a second connecting member attached to the other gather member and receiving the other snapping roll in an elongated slot formed in the second connecting member.

11. A picker construction comprising a frame, a gather member movably attached to the frame, a pair of snapping rolls movably connected to the frame by means of links attached to the frame at spaced points, and a link attached to the gather member and receiving a portion of one of the snapping rolls in a slotted connection.

12. A picker construction comprising a frame, a gather member movably connected to the frame, a snapping roll movably connected to the frame, means connecting the gather member and the snapping roll for causing one to move in response to movement of the other, and means disposed between the snapping rolls and the gather points for allowing one to move independently of the other.

13. A picker construction comprising a frame, a pair of gather points movably connected to the frame, a pair of snapping rolls movably connected to the frame, means connecting the gather points and snapping rolls for causing the gather points and snapping rolls to move with one another relative to the frame, and means disposed between the snapping rolls and the gather points for providing some relative movement between the gather points and snapping rolls.

14. A picker construction comprising a frame, a pair of gather points pivotally mounted on the frame on the same axis, a pair of snapping rolls connected against relative movement and movably connected to the frame by means of sets of parallel links, one link of each set being pivotally attached to the frame on the same axis as the gather points, and links attached to the gather points and receiving in elongated slots respectively formed therein portions of the snapping rolls to which are attached the said parallel links attached to the frame on the same axis as the gather points.

15. A picker construction comprising a frame, a pair of snapping rolls positioned in spaced parallel relation, and parallel links pivotally mounted on the frame and connecting the frame and snapping rolls.

16. A picker construction comprising a frame, a pair of snapping rolls positioned in spaced parallel relation, a first pair of links of equal length attached to the frame at spaced points and to one snapping roll at points spaced the same amount as the points of attachment to the frame, and a second pair of links of equal length attached to the frame at spaced points and to the other snapping roll at points spaced the same amount as the points of attachment to the frame.

17. A picker construction comprising a frame, a pair of snapping rolls, parallel links movably connecting the frame and snapping rolls, and means connecting two of the links for preventing a relative movement between the snapping rolls.

18. A picker construction comprising a supporting means, a snapping roll, and parallel links movably connecting the supporting means and the snapping roll.

19. A picker construction comprising a supporting means, a snapping roll, and links movably connecting the supporting means at spaced points and the snapping roll at spaced points.

20. A picker construction comprising a frame, a pair of snapping rolls, and links movably connecting the frame and the snapping rolls.

BENJAMIN M. HYMAN.